Sept. 5, 1944. W. ULLRICH 2,357,710
DISTILLATION OF HYDROCARBONS
Filed Aug. 1, 1942
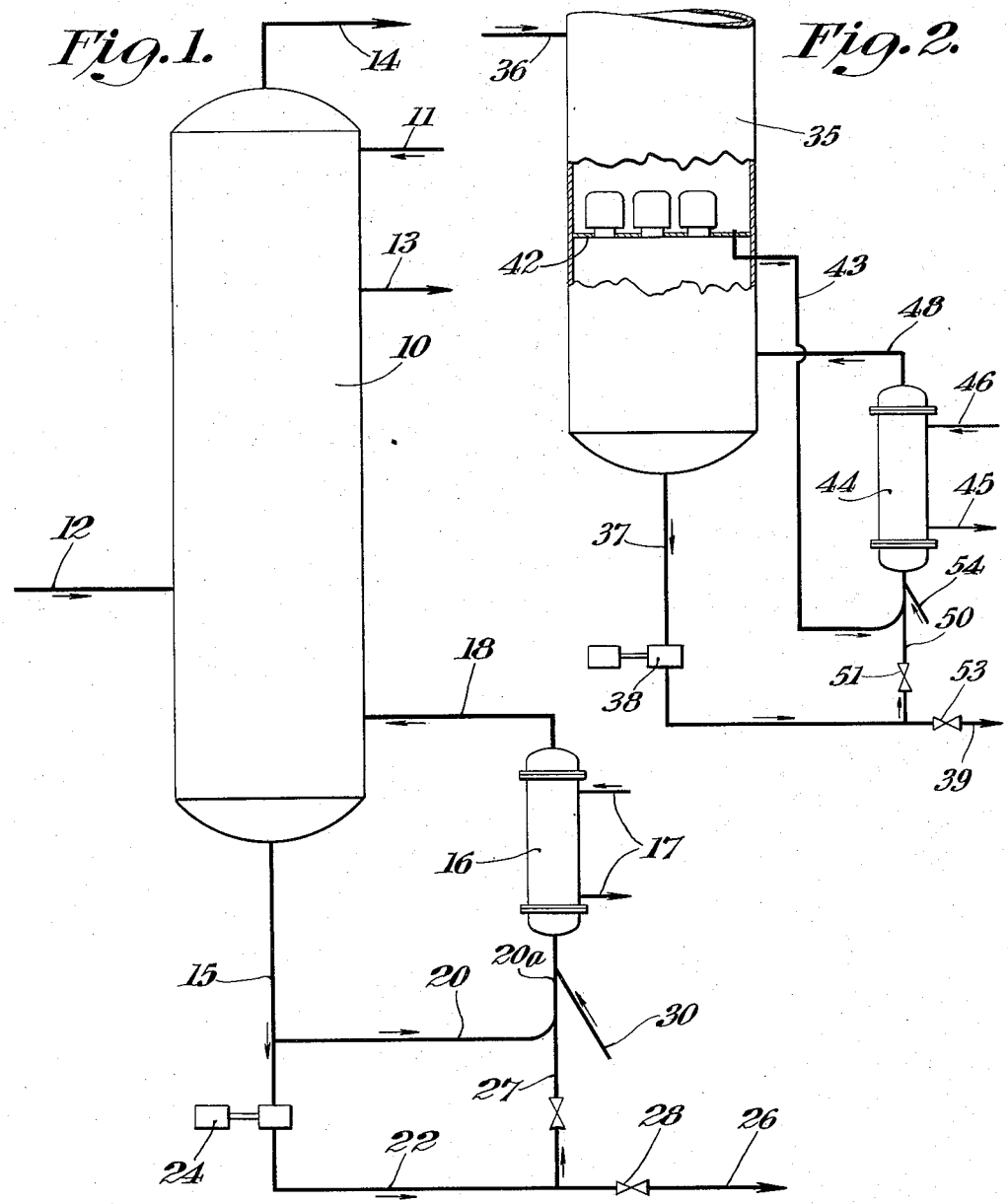
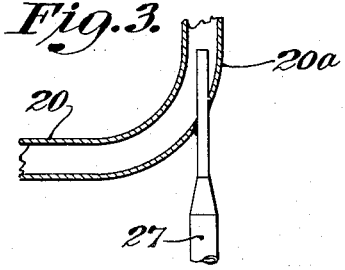
INVENTOR
Walter Ullrich
BY Nathaniel Ely
ATTORNEY Patented Sept. 5, 1944

2,357,710

UNITED STATES PATENT OFFICE 2,357,710

DISTILLATION OF HYDROCARBONS

Walter Ullrich, Jackson Heights, N. Y., assignor to The Lummus Company, New York, N. Y., a corporation of Delaware Application August 1, 1942, Serial No. 453,230

6 Claims. (Cl. 202—153)

This invention relates to improvements in the distillation of hydrocarbon mixtures or of similar complex mixtures.

In the separation of a particular hydrocarbon mixture or the like in a distillation column, it is frequently necessary or desirable to subject the bottoms from the column to rebolling before its removal from the system. The effect of the reboiling is two-fold in that additional heat is supplied to the column and the lighter vaporizable constituents remaining in the bottoms are separated or stripped therefrom whereby the efficiency of the fractionation is increased.

Two types of reboiling circuits are in common use: the circulating reboiler and the once-through reboiler. Each of these systems, however, is subject to serious operating disadvantages under certain conditions. For example, when the charge to the circulating reboiler contains only a relatively small percentage of light vaporizable materials, the resulting circulation of this charge stream through the reboiler is insufficient to produce the desired results. Likewise, when the charge to the once-through reboiler contains a relatively large percentage of light vaporizable materials, it is virtually impossible to obtain the desired separation of the retained light vaporizable constituents from the heavy residual constituents.

The principal object of my invention is to provide an improved system for reboiling the bottoms of a distillation column whereby the separation of the retained light vaporizable constituents therefrom is effectively accomplished.

A specific object of my invention is to provide supplemental circulation for a circulating reboiler whereby the natural circulation therethrough is supplemented without a material increase in the operating expense and an adequate velocity of the materials flowing through the reboiler unit is assured.

A further specific object of my invention is to provide forced circulation for a once-through reboiler whereby the flow of materials therethrough is supplemented so that the desired separation of the relatively light from the relatively heavy constituents can be effected.

Further objects and advantages of my invention will appear from the following description of a preferred form of embodiment thereof taken in connection with the attached drawing, in which:

Fig. 1 is a simplified diagrammatic flow arrangement of a distillation unit provided with a circulating reboiler embodying my invention.

Fig. 2 is a partial flow arrangement of a distillation unit provided with a once-through reboiler embodying my invention.

Fig. 3 is a detailed view of the jet injector utilized in my invention.

In accordance with a preferred form of embodiment of my invention, I have shown a conventional distillation column 10 provided with the usual feed line 12. The feed, which may comprise a suitable hydrocarbon mixture, is fractionated in column 10 into one or more side stream products removed as at 13, an overhead product removed through line 14, and a bottoms product removed through line 15. For the purpose of illustration of my invention, it is to be understood that column 10 is provided with the usual bubble trays for contact of the ascending vapors with the descending liquid and that the lighter materials, which are removed overhead at 14, are substantially in the vaporous condition and that the bottoms product is a liquid. Suitable reflux for the column may be provided through line 11.

To supply additional heat to column 10 and to strip any light vaporizable materials retained in the bottoms stream removed through line 15, it is necessary to reheat such bottoms and to reintroduce the heated bottoms into column 10 above the liquid level in the bottom thereof so that the vaporized portion may be separated. For this purpose, it is common to continuously circulate a portion of the column bottoms through a circulating reboiler generally indicated at 16, which may be heated by the passage of a suitable heating medium through circuit 17, and to discharge the heated and partly vaporized bottoms through the line 18 into the lower portion of column 10 as shown.

The flow of the bottoms from column 10 to the reboiler 16 has been accomplished in the prior art either by the provision of a simple thermosyphon circuit including the line 20 or, alternatively, by a circuit including the line 22, through which the bottoms is forced under pressure from the pump 24. When the bottoms contains a relatively small amount of light vaporizable materials, however, the thermosyphon effect is so small that there is no substantial movement of the circulated bottoms through the reboiler 16. Furthermore, if the forced circulation circuit is utilized in such case, the use of the bottoms discharge pump 24 for the purpose of circulating a portion of the bottoms through the reboiler 16 is extremely expensive since the amount of liquid that must be circulated in order to supply the desired additional heat is substantially greater than the amount of net product. Accordingly, this pump must necessarily have a sufficient capacity to handle all of the bottoms from column 10; and, in such case, the capacity of the pump is generally several times larger than and normally four or five times as large as that necessary to handle only the amount of bottoms which is discharged as the ultimate product at 26.

I have found it highly successful, in handling a bottoms of such nature, to use both the thermosyphon and the forced feed circuits in conjunction with each other with the unexpected result that the vaporization of the light materials and the supplying of the desired additional heat to the column can be effectively and economically accomplished. According to my invention, I supplement the natural thermosyphon circulation through line 20 by a portion of the total capacity of the pump 24, which diverts a portion of the bottoms under pressure through the line 27 into the reboiler 16. A valve 28 may be used for the purpose of controlling the net discharge of bottoms at 26; and, by operation of the pump 24 at the desired speed, a positive influence is obtained on the natural circulation. It is to be understood that the capacity of the line 20 is considerably greater than the capacity of the line 22 so as to provide for the thermosyphon circulation of the larger amount of circulated bottoms. Only a small portion of the bottoms product need be diverted through line 27, for injection into line 20, however, in order to give the necessary added velocity to the circulating bottoms stream. Consequently, the capacity of the pump 24 is not materially increased by reason of this diversion; and, in many cases, the pump which is installed to discharge the net bottoms product from the system will have a capacity sufficient to handle this small diversion.

As shown in Fig. 3, the junction of lines 27 and 20 is desirably arranged in the form of a jet injector or the like. The line 20a, which introduces the circulating material into reboiler 16, is substantially larger than the line 27, which may project above the line 20 as shown. In this manner, the introduction of a portion of the bottoms under pressure through line 27 exerts a suction effect on the material flowing through line 20 and thereby serves to induce a greater flow of the naturally circulating material from line 20 into line 20a. It is to be noted that the end of line 20 is desirably curved as shown to increase the suction effect. Any other form of jet injector may be used as is well understood.

It may also be found desirable to introduce some steam through the line 30 into line 20a to aid the circulation of the bottoms material through reboiler 16. Preferably, the steam is injected into the circulating stream so that advantage can be taken of the suction effect in order to increase the velocity of the circulating stream. For this purpose, a jet injector construction such as that shown in Fig. 3 may be installed at the junctions of lines 30 and 20a.

It should be noted that, from the standpoint of supplemental force, the injection of steam in line 30 or the injection of the diverted portion of the bottoms product in line 27 under pressure has substantially the same effect. The steam, however, has the added advantage of lowering the partial pressure of the light materials and thereby aids in the vaporization of such light materials from the circulated bottoms. In some cases, however, it may not be necessary to use the effect both of the injection of the diverted bottoms under pressure through line 27 and of the injection of steam through line 30. It is within the concept of my invention that either or both of these forces may be used to supplement the natural circulation of the material flowing through line 20, which carries the major portion of the bottoms from column 10.

The arrangement shown in Fig. 2 embodies my invention in a once-through type of reboiler. In this case, the column 35 is also provided with the usual bubble trays; and a suitable feed is introduced thereinto at 36 and is fractionated therein to produce a bottoms product, which is removed through the line 37. This bottoms product is discharged from the system under pressure from pump 38 through the product line 39.

In this type of operation, it is customary to withdraw all the liquid from the lowermost bubble tray 42 and to pass such liquid through line 43 to the reboiler 44, which may be heated by any suitable outside heating medium entering at 46 and discharging at 45. The resulting heated liquid passes from the reboiler through line 48 and is reintroduced into the lower portion of column 35 below tray 42 and above the level of the liquid in the bottom of the column so that the vaporized portion may be separated therefrom. The amount of material passed through the reboiler in this type of operation depends only on the amount of liquid collected on tray 42 provided that the differential hydrostatic head between the tray and the reboiler is sufficient and line 43 is properly sized. When, however, the liquid on tray 42 contains a relatively large amount of light vaporizable materials, for example, 75% by volume or more, and a relatively small amount of heavy residual materials, for example, 25% or more, it is virtually impossible to obtain the desired separation of the light from the heavy materials in such customary arrangement.

I have found that, in the treatment of a bottoms of such a nature, a supplemental force on this stream adding the effect of positive circulation thereto is unexpectedly helpful. As in the other arrangement, I prefer to divert a small portion of the bottoms under pressure from pump 38 through line 50 into the once-through reboiler 44. The lines 50 and 39 are provided with suitable valves 51 and 53, respectively, for controlling the amount of bottoms thus diverted. A jet injector arrangement as shown in Fig. 3 may also be used at the junction of lines 50 and 43 if desired, and the end of line 43 may also be curved as shown in order to increase the suction effect on the liquid flowing through this line. I can thus subject the once-through stream in line 43 to as much force or pressure as is necessary to produce the desired rate of flow.

A diversion of a part of the bottoms product through line 50 does not increase the load on pump 38 to any appreciable extent, for the amount of diverted bottoms necessary to effect the desired separation of the large amount of light materials from the small amount of heavy materials requires only a relatively small portion of the pump capacity. In this manner, the once-through reboiler is in effect modified so that it approaches a circulating type reboiler; and the desired operation can be more efficiently carried out.

If desired, I can also inject steam as at 54 into line 50 above its junction with line 43. The effect of this steam, besides lowering the partial pressure of the vaporizable material, is to decrease the volume of diverted bottoms that must be handled by pump 38 and, thus, to decrease somewhat the load on this pump. I have found that the injection of a portion of the bottoms into line 43 under pressure either with or without the conjunctive injection of steam through line 54 is highly satisfactory in effecting the desired separation. On the other hand, the use of steam alone does not materially improve the operation; for the quantity of steam required is so great as to seriously overload the reboiler and the column as well.

Where the differential head on the liquid flowing through line 43 is insufficient, the injection of a portion of the column bottoms into this line under pressure substantially aids the passage of such liquid through reboiler 44. Similarly, where the line 43 is undersized with respect to the amount of liquid flowing therethrough, such diversion of the bottoms stream also is highly effective. Furthermore, this arrangement may also be satisfactorily used where the liquid in line 43 contains a relatively small percentage of light vaporizable materials.

It may not always be desirable to use steam to aid the flow through the reboiler. For example, if the bottoms contains any appreciable amount of a water soluble acid such as hydrogen sulfide, corrosion of the apparatus rapidly takes place when steam is used. A similar objection to the use of steam arises where the material in the column contains other substances which are corrosive in the presence of steam.

It will thus be seen that in each arrangement the natural flow or circulation of at least a portion of the column bottoms through the respective reboiler is supplemented by a forced circulation. This forced circulation may result from the injection into the circulating stream of a portion of the bottoms product under a pressure or hydrostatic head greater than that maintained on the circulating stream or from the injection of steam, which is desirably also under a greater pressure, into this circulating stream (desirably only in the arrangement shown in Fig. 1) or from the conjoint use of both methods. The net effect in each case is to effectively improve the separation of the light vaporizable materials. It is to be noted that the natural circulation in the arrangement shown in Fig. 1 is a thermosyphon circulation and in the arrangement shown in Fig. 2 may be a circulation under a gravity or hydrostatic head or a thermosyphon circulation.

My invention is particularly applicable to the distillation of complex hydrocarbon mixtures such as obtained in the refining of petroleum. It is also applicable, however, to the distillation of other complex liquid mixtures such as mixtures of the higher fatty acids or the like. In addition, my invention may not only be employed in connection with a reboiler for a distillation column but also in connection with a reboiler for a side stream stripper or the like.

While I have shown preferred forms of embodiment of my invention, I am aware that other modifications may be made thereto; and I, therefore, desire a broad interpretation of my invention within the scope and spirit of the description herein and of the claims appended hereinafter.

I claim:

1. In a distillation apparatus including a distillation column, a bottoms reboiling circuit associated with said column and comprising a bottoms discharge line leading from the lower portion of the column, a pump in said line to maintain a substantial hydrostatic head on the discharged bottoms, a reboiler, a first conduit leading from the lower portion of the column and in delivery connection with the bottoms inlet of said reboiler to introduce a portion of the bottoms thereinto, a second conduit in receiving connection with the bottoms product outlet of the reboiler and leading to the lower portion of the column to return the bottoms to the latter, said conduits and reboiler being arranged for natural circulation of bottoms products in a stream from the column and through the reboiler and back to the column, and a third conduit leading from the said discharge line at a point located after the pump to one of said reboiler connection conduits and having within the latter a restricted injector nozzle directed to assist said natural circulation of the bottoms products through the reboiler by injection into said stream of a portion of the bottoms from the discharge line under pressure of said pump.

2. In a distillation apparatus including a distillation column, a bottoms reboiling circuit associated with said column and comprising a bottoms discharge line leading from the lower portion of the column, a pump in said line to maintain a substantial hydrostatic head on the discharged bottoms, a reboiler, a first conduit leading from the lower portion of the column and in delivery connection with the bottoms inlet of said reboiler to introduce a portion of the bottoms thereinto, a second conduit in receiving connection with the bottoms outlet of the reboiler and leading to the lower portion of the column to return the bottoms to the latter, said conduits and reboiler being arranged for natural circulation of bottoms in a stream from the column and through the reboiler and back to the column, a third conduit leading from the said discharge line at a point located after the pump to said first conduit and having within the latter a restricted injector nozzle directed to assist said natural circulation of the bottoms through the reboiler by injection into said stream of a portion of the bottoms from the discharge line under pressure of said pump, and means for injecting steam into said first conduit independently of said bottoms injection to further assist said circulation and also assist vaporization of the light constituents of the bottoms.

3. A reboiling circuit for a distillation column, which comprises a bottoms product discharge line, a pump therein to maintain a substantial hydrostatic head on the discharged bottoms product, a reboiler, a first conduit between the bottom of the column and one end of the reboiler to introduce a portion of the bottoms thereinto, a second conduit between the other end of the reboiler and the lower portion of the distillation column to return the bottoms thereto, a third conduit between the bottoms product line after the pump and the first conduit to divert a portion of such bottoms product, and means to directly inject such diverted bottoms product under pressure from said pump into the first conduit to assist flow through the latter to the reboiler.

4. A reboiling circuit for a distillation column, which comprises a bottoms product discharge line, a pump therein to maintain a substantial hydrostatic head on the discharged bottoms product, a reboiler, a first conduit between the bottom of the column and one end of the reboiler to introduce a portion of the bottoms thereinto, a second conduit between the other end of the reboiler and the lower portion of the distillation column to return the bottoms thereto, a third conduit between the bottoms product line after the pump and the first conduit to divert a portion of such bottoms product, means to directly inject such diverted bottoms product under pressure from said pump into the first conduit to assist flow through the latter to the reboiler, and means to inject steam into said first conduit to supplement the effect of the injected bottoms product and also assist vaporization of the light constituents of the bottoms.

5. A reboiling circuit for a distillation column, which comprises a bottoms product discharge line, a pump therein to maintain a substantial hydrostatic head on the discharged bottoms product, a reboiler, a first conduit between the lowermost tray of the column and one end of the reboiler to introduce the liquid thereon into the reboiler, a second conduit between the other end of the reboiler and the lower portion of the distillation column below the lowermost tray to return the bottoms thereto, a third conduit between the bottoms product line after the pump and the first conduit to divert a portion of such bottoms product, and means to directly inject such diverted bottoms product under pressure from said pump into the first conduit to assist flow through said first conduit to the reboiler.

6. A reboiling circuit for a distillation column, which comprises a bottoms product discharge line, a pump therein to maintain a substantial hydrostatic head on the discharged bottoms product, a reboiler, a first conduit between the lowermost tray of the column and one end of the reboiler to introduce the liquid thereon into the reboiler, a second conduit between the other end of the reboiler and the lower portion of the distillation column below the lowermost tray to return the bottoms thereto, a third conduit between the bottoms product line after the pump and the first conduit to divert a portion of such bottoms product, means to directly inject such diverted bottoms product under pressure from said pump into the first conduit to assist flow through the latter to the reboiler, and means to inject steam into said first conduit to supplement the effect of the injected bottoms product and also assist vaporization of the light constituents of the bottoms.

WALTER ULLRICH.